United States Patent
Baumgarten et al.

(10) Patent No.: US 12,017,652 B2
(45) Date of Patent: Jun. 25, 2024

(54) METHOD AND DEVICE FOR DISPLAYING A FEASIBILITY OF AN AT LEAST SEMI-AUTOMATICALLY EXECUTABLE DRIVING MANEUVER IN A TRANSPORTATION VEHICLE

(71) Applicant: VOLKSWAGEN AKTIENGESELLSCHAFT, Wolfsburg (DE)

(72) Inventors: Jens Baumgarten, Berlin (DE); Kyoung Sun Han, Berlin (DE); Jörn Michaelis, Berlin (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 191 days.

(21) Appl. No.: 16/765,959

(22) PCT Filed: Nov. 12, 2018

(86) PCT No.: PCT/EP2018/080978
§ 371 (c)(1),
(2) Date: May 21, 2020

(87) PCT Pub. No.: WO2019/105728
PCT Pub. Date: Jun. 6, 2019

(65) Prior Publication Data
US 2020/0361472 A1    Nov. 19, 2020

(30) Foreign Application Priority Data

Nov. 30, 2017   (DE) ..................... 10 2017 221 619.0

(51) Int. Cl.
*B60K 35/28*   (2024.01)
*B60W 30/18*   (2012.01)
(Continued)

(52) U.S. Cl.
CPC ...... *B60W 30/18163* (2013.01); *B60W 50/14* (2013.01); *B60W 60/001* (2020.02);
(Continued)

(58) Field of Classification Search
CPC ........... B60W 30/18163; B60W 50/14; B60W 60/001; B60W 2050/146;
(Continued)

(56) References Cited

U.S. PATENT DOCUMENTS

| | | | |
|---|---|---|---|
| 10,252,670 B2 | 4/2019 | Zieglmeier et al. | |
| 2005/0209766 A1* | 9/2005 | Perisho | B60K 31/0083 180/170 |

(Continued)

FOREIGN PATENT DOCUMENTS

| | | | |
|---|---|---|---|
| CN | 106218501 A | 12/2016 | |
| DE | 10343199 A1 | 4/2005 | |

(Continued)

OTHER PUBLICATIONS

Search Report for International Patent Application No. PCT/EP2018/080978; Feb. 22, 2019.

(Continued)

*Primary Examiner* — Abby Y Lin
*Assistant Examiner* — Hossam M Abd El Latif
(74) *Attorney, Agent, or Firm* — Barnes & Thornburg LLP (57) ABSTRACT

A method for displaying a feasibility of an at least semi-automatically executable driving maneuver in a transportation vehicle wherein data regarding the surroundings of the transportation vehicle forms the basis for determining whether the driving maneuver is able to be executed in the position of the transportation vehicle. A first graphical object is generated and displayed on a display surface, which signals whether the driving maneuver is able to be executed.

(Continued)

A device for displaying a feasibility of an at least semi-automatically executable driving maneuver in a transportation vehicle.

16 Claims, 4 Drawing Sheets

(51) Int. Cl.
  *B60W 50/14* (2020.01)
  *B60W 60/00* (2020.01)
(52) U.S. Cl.
  CPC . *B60W 2050/146* (2013.01); *B60W 2554/804* (2020.02); *B60W 2555/60* (2020.02)
(58) Field of Classification Search
  CPC ........ B60W 2554/804; B60W 2555/60; B60K 2370/16; B60R 11/04; B60Q 1/52; G02B 27/00; G01C 21/36; H04L 29/06; H04L 29/08; H04W 76/19; H04W 84/18
  USPC .......................................................... 701/23
  See application file for complete search history.

(56) References Cited

U.S. PATENT DOCUMENTS

| | | | | |
|---|---|---|---|---|
| 2013/0179023 | A1* | 7/2013 | Schmidt | B60W 50/14 |
| | | | | 701/23 |
| 2014/0010620 | A1* | 1/2014 | Elliott | B65D 90/623 |
| | | | | 414/808 |
| 2015/0166062 | A1* | 6/2015 | Johnson | B60W 10/20 |
| | | | | 701/41 |
| 2016/0052394 | A1* | 2/2016 | Yamada | G06T 19/006 |
| | | | | 701/93 |
| 2016/0098861 | A1* | 4/2016 | Sisbot | G06V 20/597 |
| | | | | 345/633 |
| 2016/0291153 | A1* | 10/2016 | Mossau | G01S 15/878 |
| 2016/0368416 | A1* | 12/2016 | Nemitz | B60Q 1/52 |
| 2017/0136878 | A1* | 5/2017 | Frank | G05D 1/021 |
| 2017/0240185 | A1* | 8/2017 | Li | G08B 7/06 |
| 2018/0024354 | A1* | 1/2018 | Shibata | B60W 30/165 |
| | | | | 345/7 |
| 2018/0118223 | A1* | 5/2018 | Mori | B60W 50/14 |
| 2018/0281856 | A1* | 10/2018 | Talamonti | B62D 15/0255 |
| 2019/0064824 | A1* | 2/2019 | Nix | B60W 50/08 |
| 2019/0164424 | A1 | 5/2019 | Kleen et al. | |
| 2019/0329780 | A1 | 10/2019 | Tomescu | |
| 2020/0269747 | A1* | 8/2020 | Kusayanagi | B60K 35/00 |
| 2021/0146943 | A1* | 5/2021 | Oniwa | B60R 21/00 |

FOREIGN PATENT DOCUMENTS

| | | |
|---|---|---|
| DE | 102004005815 B3 | 6/2005 |
| DE | 102009010121 A1 | 12/2009 |
| DE | 102009053473 A1 | 5/2011 |
| DE | 102011082398 A1 | 3/2013 |
| DE | 102011121948 A1 | 6/2013 |
| DE | 102013008357 A1 * 11/2014 ............. B60K 35/00 |
| DE | 102013008357 A1 | 11/2014 |
| DE | 102014018364 A1 | 6/2016 |
| DE | 102015015672 A1 | 7/2016 |
| DE | 102016207791 A1 | 11/2017 |
| EP | 3196861 A1 | 7/2017 |

OTHER PUBLICATIONS

Office Action; Chinese Patent Application No. 201880068225.7; Nov. 25, 2022.
Office Action; Chinese Patent Application No. 201880068225.7; Jul. 31, 2023.

* cited by examiner

METHOD AND DEVICE FOR DISPLAYING A FEASIBILITY OF AN AT LEAST SEMI-AUTOMATICALLY EXECUTABLE DRIVING MANEUVER IN A TRANSPORTATION VEHICLE

PRIORITY CLAIM

This patent application is a U.S. National Phase of International Patent Application No. PCT/EP2018/080978, filed 12 Nov. 2018, which claims priority to German Patent Application No. 10 2017 221 619.0, filed 30 Nov. 2017, the disclosures of which are incorporated herein by reference in their entireties.

SUMMARY

Illustrative embodiments relate to a method for displaying the feasibility of a driving maneuver which can be carried out at least partially automatically in a transportation vehicle. In addition, illustrative embodiments relate to a device for displaying the feasibility of the driving maneuver which can be carried out at least partially automatically in a transportation vehicle.

BRIEF DESCRIPTION OF THE DRAWINGS

The disclosed embodiments will now be explained with reference to the drawings, in which.

DETAILED DESCRIPTION

In the case of transportation vehicles which drive at least partially autonomous, driving maneuvers can be carried out automatically by the transportation vehicle itself. If a driving maneuver is to be carried out, it is generally not possible for the transportation vehicle occupants to determine whether the maneuver can be carried out at all at the instantaneous transportation vehicle position. If a driving maneuver cannot be carried out owing to external influences such as legal prohibitions or existing risks as a result of objects, this can lead to irritation of the transportation vehicle occupants if the associated function of the driving maneuver such as, e.g., a lane change, was activated, but the maneuver was not carried out.

DE 103 43 199 A1 describes a method for the displaying of information by a driver assistance system. In this context, the function status of a driver assistance system is displayed in the activated state.

Furthermore, DE 10 2011 082 398 A1 describes a method for using a driver assistance system. In this context, the plausibility of whether the functional capability of a specific driver assistance system is ensured is checked. For this purpose, information about the surroundings of the transportation vehicle, such as, e.g., the traffic density, weather or velocity, is collected. It is then possible to display the road sections of a route on which the driver assistance system is available.

DE 10 2004 005 815 B3 describes a transportation vehicle having a plurality of systems, which can be switched on and off, for assisting the driver. In this context, which of the driver assistance systems are activated can be shown in a combination symbol.

In addition, DE 10 2014 018 364 A1 describes a device for assisting a driver. In this context, other transportation vehicles located in front of and behind the transportation vehicle are determined.

Finally, DE 10 2013 008 357 A1 describes a driver assistance system for a transportation vehicle having a plurality of driver assistance modules and a display device. Display elements which display an integrated representation of the data supplied by the controlling driver assistance modules are generated on the display device.

Disclosed embodiments make available a method and a device by which it is possible to inform transportation vehicle occupants more comprehensively about the functionality of transportation vehicle maneuvers which can be carried out at least partially automatically, and as a result to increase the trust in the execution of these driving maneuvers.

This is carried out by a method and a device.

In the disclosed method, data on the surroundings of the transportation vehicle are collected. From the data on the surroundings it is determined whether the driving maneuver can be carried out at the instantaneous position of the transportation vehicle. A first graphic object which signals whether the driving maneuver can be carried out is generated and displayed on a display area.

A driving maneuver is categorized as feasible, in particular, when there is no prohibition for the execution of the desired driving maneuver. The information for this is acquired from the data on the surroundings of the transportation vehicle. Furthermore, a driving maneuver is categorized as feasible when it is possible to execute the driving maneuver without risk. A risk which prevents the driving maneuver being carried out is presented, for example, by another road user.

The disclosed method informs the transportation vehicle occupants more comprehensively about the functionality of driving maneuvers which are executed automatically or partially automatically so that the trust and the acceptance in and of the execution of these driving maneuvers are increased. The transportation vehicle occupants can then sense intuitively, quickly and easily whether a driving maneuver can at all be carried out. If this is not the case, activation of the driving maneuver initially does not cause the driving maneuver to be executed immediately. This is clarified to the transportation vehicle occupants by the display.

The driving maneuver is a lane change or an overtaking maneuver. If an overtaking maneuver is executed on a road with just one lane per direction of travel, the overtaking maneuver is composed of two lane changes. A lane change or overtaking maneuver cannot be carried out if an overtaking prohibition is present at the instantaneous position of the transportation vehicle. Furthermore, an overtaking maneuver can be categorized as not able to be carried out if an existing speed limit has to be exceeded. For this purpose, in addition the speed of a road user travelling ahead is sensed from the data on the surroundings and the speed which is required to overtake the road user traveling ahead is determined. Furthermore, a lane change is categorized as not able to be carried out if a transportation vehicle approaching from the rear on the lane to which the transportation vehicle in question is to change assumes a predetermined distance from the transportation vehicle in question. The lane change can be carried out only when the transportation vehicle which is approaching from the rear has overtaken the transportation vehicle in question.

In one refinement, the first graphic object is displayed in a first display mode if it has been determined that the driving maneuver can be carried out, and is displayed in a second display mode if it has been determined that the driving mode cannot be carried out. In this context, the first graphic object can be displayed highlighted in the second display mode. The highlighting can be implemented here, for example, by a change of color of the first graphic object. Furthermore, the first graphic object can be displayed in white or green in the first display mode. In the second display mode, the first graphic object can then be displayed in orange or red. By using the different display mode, the transportation vehicle occupants can easily detect a change in the feasibility.

The first graphic object can comprise, for example, a graphic roadway marking. In this context, the first graphic object is displayed as an interrupted roadway marking in the first display mode, and is displayed as a continuous roadway marking in the second display mode. As a result, a reference can be established with reality. Although real roadway markings do not actually have to be continuous lines in all situations in which a driving maneuver cannot be carried out, if a real roadway marking is continuous, this means that a lane change must not be carried out. As a result, it can be displayed in a real way to the transportation vehicle occupants whether a driving maneuver currently can be carried out or not. Therefore, a display with which the transportation vehicle occupant is already familiar is used.

Furthermore, a second graphic object can be generated and displayed on the display area which represents the transportation vehicle. The feasibility of the driving maneuver in a direction proceeding from the transportation vehicle is determined. The first graphic object is then displayed on the side of the second graphic object lying in the determined direction. As a result, it is displayed to the driver whether the desired driving maneuver can be carried out on a desired side. For example, on a freeway an overtaking maneuver can be carried out only via a lane lying to the left of the transportation vehicle to be overtaken. In this case it is therefore determined that an overtaking maneuver is not possible to the right. The first graphic object is then displayed on the right-hand side of the second graphic object as a continuous roadway marking. In contrast, on the left-hand side of the second graphic object an interrupted roadway marking is displayed if the overtaking maneuver can be carried out to the left.

In one refinement, the driving maneuver is assigned to a driving maneuver function. A signal by which the driving maneuver function is activated is sensed. Furthermore, a third graphic object which displays that the driving maneuver function is active is generated. If it has been determined that the driving maneuver can be carried out, the driving maneuver is carried out automatically. In this context, the signal is triggered by virtue of the fact that actuation of an actuation element is sensed. The actuation element can be here, for example, the flashing indicator light lever of the transportation vehicle. The latter is actuated, for example, by a driver of the transportation vehicle. This means that the driving maneuver is initiated by the driver but is carried out automatically by the transportation vehicle. The transportation vehicle decides when the driving maneuver is carried out. The signal serves merely to signal to the transportation vehicle that the driving maneuver is to be carried out at the next possible time. Through the generation of the third graphic object, the driver can then be certain that the transportation vehicle has also actually sensed the actuation of the actuation element and the driving maneuver function is then active. Furthermore, by virtue of the fact that the driver activates the driving maneuver function himself, he can influence the operation of an at least partially autonomously driving transportation vehicle. In addition, the driving maneuver is also actually carried out when it is determined that it can be carried out.

In addition, a setpoint direction in which the driving maneuver is to be carried out can be determined from the signal. A light signal with a flashing indicator light device of the transportation vehicle is not generated on the side of the transportation vehicle lying in the determined setpoint direction until the start of the driving maneuver which is carried out automatically. Therefore, if the driver actuates the flashing indicator light ever firstly to trigger the signal for activating the driving maneuver function, the flashing indicator light of the transportation vehicle is not also automatically activated at the same time. Instead, the flashing indicator light is also activated simultaneously only when the driving maneuver can be carried out at the instantaneous position of the transportation vehicle and is carried out automatically. In contrast, if it is determined that the driving maneuver cannot be carried out at the instantaneous position of the transportation vehicle, the flashing indicator light is firstly not activated. The flashing indicator light is therefore not activated until the start of the execution of the driving maneuver. This can prevent a situation in which a flashing indicator light of a transportation vehicle which is flashing causes confusion for other road users, for example, for road users which are currently overtaking the transportation vehicle. In addition, the direction in which the driving maneuver is to be carried out can be determined from the actuation of the actuation element. If the driver has, for example, actuated the flashing indicator light lever in such a way that the flashing indicator lights of the transportation vehicle on the right-hand side are activated, it is determined therefrom that the driving maneuver is to be carried out on the right-hand side. However, if the flashing indicator light lever is actuated in such a way that the flashing indicator lights of the transportation vehicle on the left-hand side are activated, it is determined that the driving maneuver is to be carried out on the left-hand side. As a result, the driving maneuver does not differ from a driving maneuver which is carried out manually by the driver and which generally starts with the flashing indicator light being set to a direction in which the driving maneuver is to be executed.

In a further refinement, if the driving maneuver cannot be carried out at the instantaneous position, a position at which the driving maneuver can be carried out is determined. A fourth graphic object which displays the position at which the driving maneuver is expected to be carried out is then generated on the display area. If the driver has activated the driving maneuver function, this displays to him when the desired driving maneuver is expected to be carried out. The transportation vehicle occupants are not surprised by a driving maneuver which starts suddenly.

Furthermore, the fourth graphic object can be displayed on the side of the second graphic object lying in the determined setpoint direction. As a result a direction in which the desired driving maneuver to a desired side will start is displayed to the driver.

In a further refinement, a trajectory is predicted for the driving maneuver. The profile of the predicted trajectory is then displayed on the display area. In this context the display of the trajectory can be combined with the fourth graphic object. As a result, the transportation vehicle occupants can not only sense the position at which the driving maneuver is carried out, but can also estimate the expected trajectory for the driving maneuver. As a result it can be ensured that the transportation vehicle occupants are not surprised when the driving maneuver is executed.

The data on the surroundings comprise here, in particular, roadway markings. road signs and/or other road users. If roadway markings are sensed, in particular the configuration of the roadway markings is sensed. A lane change is not permitted in the case of a continuous roadway marking. A driving maneuver is accordingly categorized as not being able to be carried out. Furthermore, for example, road signs which display an overtaking prohibition or a speed limit can be sensed. In the case of an overtaking prohibition, an overtaking maneuver cannot be carried out until a further road sign is sensed with which the overtaking prohibition is cancelled. When a speed limit is sensed, an overtaking maneuver cannot be carried out if it would involve having to exceed the speed limit. Furthermore, a lane change cannot be carried out if a transportation vehicle approaching from the rear on the lane to which the transportation vehicle in question is to change, and which would constitute a risk in the case of a lane change owing to the distance of the transportation vehicle from the transportation vehicle in question, is sensed.

Furthermore, a fifth graphic object can be generated around the second graphic object. If another road user is sensed, the position of the other road user is displayed relative to the transportation vehicle by the fifth graphic object. In this context, the fifth graphic object is embodied as a closed curve, wherein the position of the sensed road user is displayed by highlighted representation of a part of the closed curve at which the road user is located. A sixth graphic object can be generated for the sensed road user. As a result of this display, the driver can be alerted immediately if another road user approaches from the rear. The driver can sense immediately why the desired driving maneuver cannot be carried out instantaneously. The acceptance of partially automated transportation vehicle functions is increased as a result.

The disclosed embodiments further relate to a device for displaying the feasibility of a driving maneuver which can be carried out at least partially automatically in a transportation vehicle. The device comprises a sensing unit for collecting data on the surroundings of the transportation vehicle. Furthermore, the device comprises a determining unit by which it can be determined on the basis of data from the surroundings whether the driving maneuver can be carried out at the instantaneous position of the transportation vehicle. The device also comprises a control device and a display unit. The display unit can be actuated by the control device in such a way that a first graphic object which signals whether the driving maneuver can be carried out is displayed on a display area of the display unit. The device is configured to execute the disclosed method and therefore has all the benefits of the method.

Furthermore, the exemplary embodiments relate to a transportation vehicle having a disclosed device.

Figure 1:
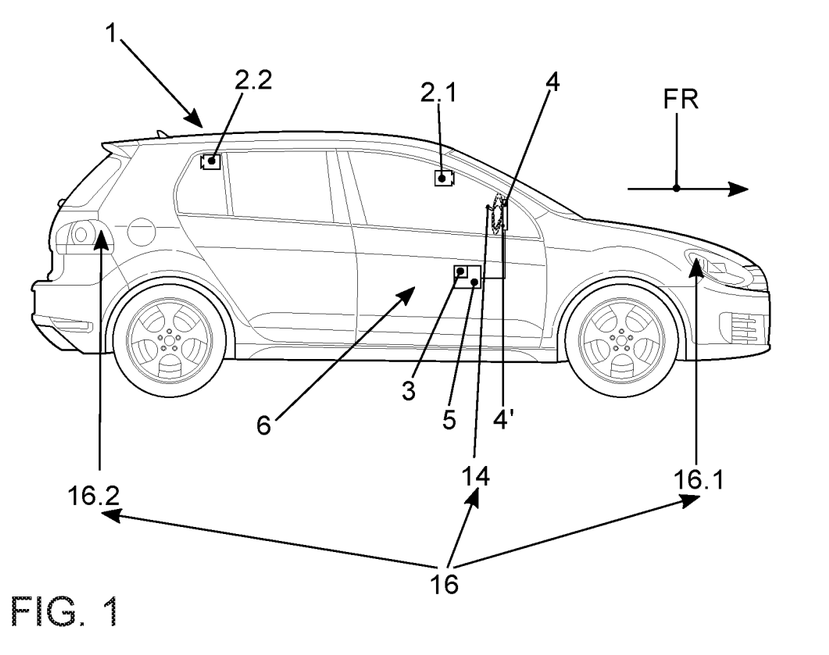
FIG. 1 shows an exemplary embodiment of a disclosed device.

With reference to FIG. 1, a first exemplary embodiment of a device 6 which is arranged in a transportation vehicle 1 is explained.

The transportation vehicle 1 can be operated partially autonomously or fully autonomously. The transportation vehicle 1 has a driving maneuver function with which driving maneuvers can be carried out automatically. In a partially autonomous mode of the transportation vehicle, the driving maneuver function is activated by a transportation vehicle occupant. The driving maneuver is, however, then carried out automatically without intervention by a transportation vehicle occupant being necessary. In addition, the driving maneuver can also be carried out in such a way that only the steering function is performed by the transportation vehicle. In contrast, the speed control can be taken over by the driver himself.

A driving maneuver which is covered by the driving maneuver function is in this context, for example, a lane change and/or an overtaking maneuver.

The device 6 comprises a first sensing unit 2.1 and a second sensing unit 2.2. The sensing units 2.1 and 2.2 are configured here, for example, as cameras. The first camera 2.1 is oriented forward with respect to the direction of travel FR. The second camera 2.2 is oriented rearward with respect to the direction of travel FR. The cameras 2.1 and 2.2 are configured here to collect data from the surroundings of the transportation vehicle 1. As a result of the fact that the first camera 2.1 is oriented forward and the second camera 2.2 is oriented rearward, a large range of the surroundings of the transportation vehicle 1 can be covered. Furthermore, additional sensors which are arranged on the transportation vehicle 1, such as for example, radar sensors, infrared sensors and/or ultrasonic sensors, can be used for sensing the surroundings of the transportation vehicle.

The device 6 also comprises a display unit 4 with a display area 4'. The display unit 4 can be arranged here in the center console of the transportation vehicle 1. Alternatively, the display unit 4 can also be arranged in a combination instrument of the transportation vehicle 1. In addition, the device 6 can also comprise a plurality of display units 4 with display areas 4'.

The display unit 4 is connected to a control device 5. In turn, a determining unit 3 is arranged in the control device 5. The data of the cameras 2.1 and 2.2 are transferred to the determining unit 3 and processed further there. The display unit 4 is actuated by the control device 5 in accordance with the data on the surroundings of the transportation vehicle 1 in such a way that a display is displayed on the display area 4', by which the driver can sense whether a driving maneuver which is, for example, a lane change or an overtaking maneuver can be carried out at the instantaneous position of the transportation vehicle 1.

Furthermore, the device 6 comprises a flashing indicator light device 16, which comprises an actuation element 14 and the front flashing indicator light 16.1 and the rear flashing indicator light 16.2 of the transportation vehicle 1. The actuation element 14 is here a flashing indicator light lever which is generally arranged at a steering wheel of the transportation vehicle 1. Furthermore, the flashing indicator light lever 14 serves to activate the driving maneuver function.

Figure 2:
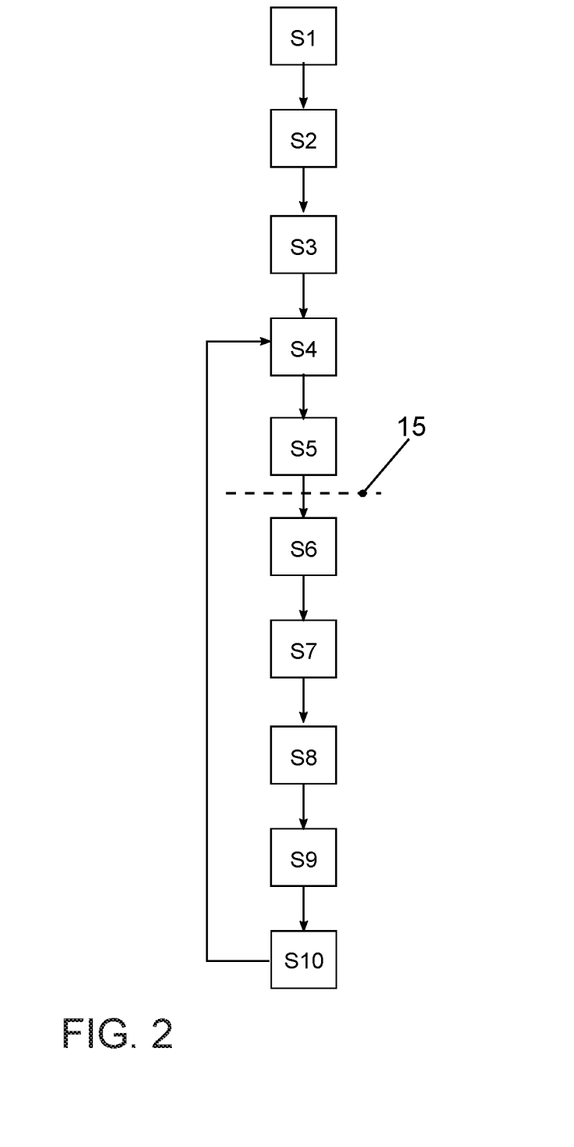
FIG. 2 shows a flow diagram of an exemplary embodiment of the disclosed method.
Figure 3:
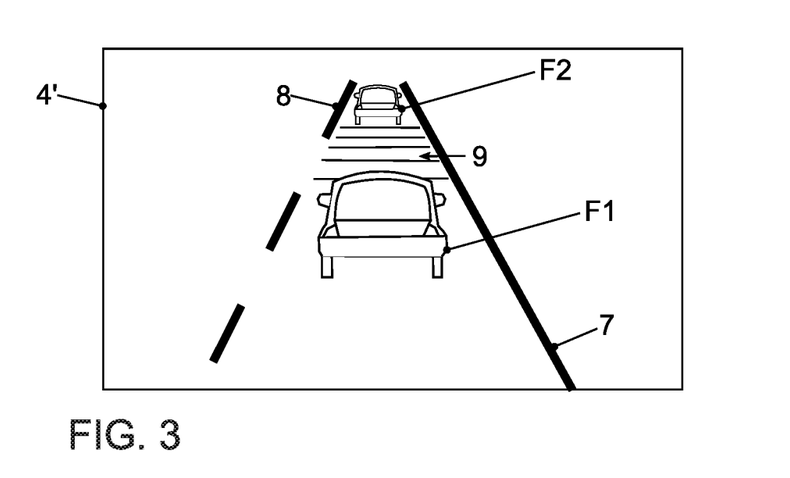
FIG. 3 shows a first display which can be generated by the disclosed method.
Figure 4:
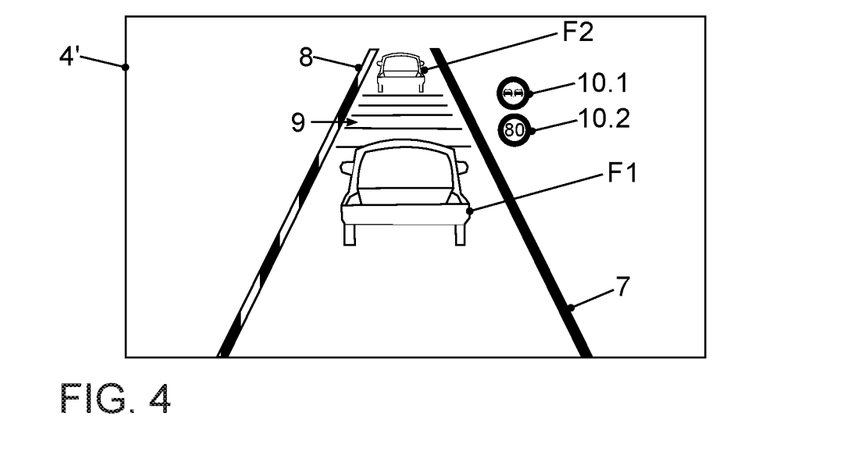
FIG. 4 shows a second display which can be generated by the disclosed method.

With reference to FIGS. 2, 3 and 4, an exemplary embodiment of a disclosed method and displays which can be generated by the method are explained. The method can be executed by the device 6 described above.

The starting situation here is that the transportation vehicle 1 is driving on a country road. In this context, the country road has one lane per direction of travel. In this situation it is to be possible to carry out an overtaking maneuver as a driving maneuver.

In operation at S1 of the method, firstly data on the surroundings of the transportation vehicle 1 are collected by the cameras 2.1 and 2.2.

In operation at S2, it is determined from the data on the surroundings that an overtaking maneuver can be carried out without difficulty. In this context, no road users which constitute a risk for the transportation vehicle 1 during an overtaking maneuver have been sensed. In addition, no road signs or continuous roadway markings which display a prohibition for an overtaking maneuver have been sensed.

In operation at S3, the display shown in FIG. 3 is then displayed. A graphic object F1 for the transportation vehicle 1 in question, referred to as an ego transportation vehicle, is displayed on the display area 4'. Furthermore, a graphic object F2 for a transportation vehicle which is sensed in front of the transportation vehicle 1 is displayed on the display area 4'. Furthermore, the graphic objects 7 and 8 which display to the driver the direction in which an overtaking maneuver can start are generated. The graphic object 7 constitutes here a continuous roadway marking. As a result, it is displayed to the driver that a lane change to the right cannot be carried out. There is no further lane to the right of the transportation vehicle. The graphic object 8 is displayed as interrupted roadway marking. As a result of the fact that the roadway marking is displayed in an interrupted state, it is displayed to the driver as with real roadway markings that a lane change to the left can be carried out at the instantaneous position.

Furthermore, distance lines 9 which are part of a distance warning system are displayed in front of the ego transportation vehicle. If the sensed road user which is represented by the graphic object F2 is closer to the transportation vehicle 1 than a predetermined distance, a distance warning is output.

As a result of this display, it is displayed to the driver when and in which direction an overtaking maneuver can start at the instantaneous position. When the driving maneuver function is activated, the overtaking maneuver would be carried out to the left.

In operation at S4, data on the surroundings of the transportation vehicle 1 continue to be collected. In this context, for example, two road signs are sensed by the camera 2.1. One of these road signs displays here an overtaking prohibition, and the second road sign displays a speed limit of 80 km/h. It is determined from this that an overtaking maneuver cannot be carried out owing to the legal prohibition at the instantaneous position of the transportation vehicle 1.

The display is then changed in operation at S5 to the effect that firstly graphic representations 10.1 and 10.2 of the road signs are generated. Furthermore, the display mode of the graphic roadway marking 8 is changed. The roadway marking 8 is then displayed in a continuous state. Furthermore, the roadway marking 8 is displayed highlighted in a different color in comparison with the roadway marking 7. As a result, it is displayed to the driver in a clarified state that the transportation vehicle 1 instantaneously cannot carry out a lane change and therefore an overtaking maneuver on the left-hand side.

Furthermore, with reference to FIG. 2 a first exemplary embodiment is explained for continuation of the method subsequent to operation at S5 of the method.

If the driver of the transportation vehicle 1 actuates the flashing indicator light lever 14 of the transportation vehicle 1, in operation at S6 a signal is generated. With this signal it is displayed to the driver 1 that the driving maneuver function is now activated. In this context, it is sensed that the driver has pressed the flashing indicator light lever downward. Therefore, the overtaking maneuver is to be executed to the left.

As already determined in operation at S4, at the instantaneous position of the transportation vehicle 1 a lane change and therefore an overtaking maneuver cannot be carried out. Therefore, the left-hand flashing indicator lights 16.1 and 16.2 of the transportation vehicle 1 are initially not activated.

In operation at S7 it is sensed that the overtaking prohibition and the speed limit of 80 km/h will be lifted in 500 m, for example.

When the position at which the overtaking prohibition and the speed limit of 80 km/h will be lifted, a lane change and therefore the overtaking maneuver can then be carried out. In operation at S8, the display of FIG. 3 is restored.

Furthermore, when this position is reached in operation at S9, the left-hand flashing indicator lights 16.1 and 16.2 are activated. As a result, it is displayed to other road users that the transportation vehicle 1 is now carrying out a lane change to the left.

In operation at S10 the overtaking maneuver is started by the transportation vehicle 1 changing over to the left onto the lane running in the opposite direction, next to the road user to be overtaken. Ahead of the road user to be overtaken, the transportation vehicle 1 will subsequently cut in again onto the original lane to conclude the overtaking maneuver.

Figure 5:
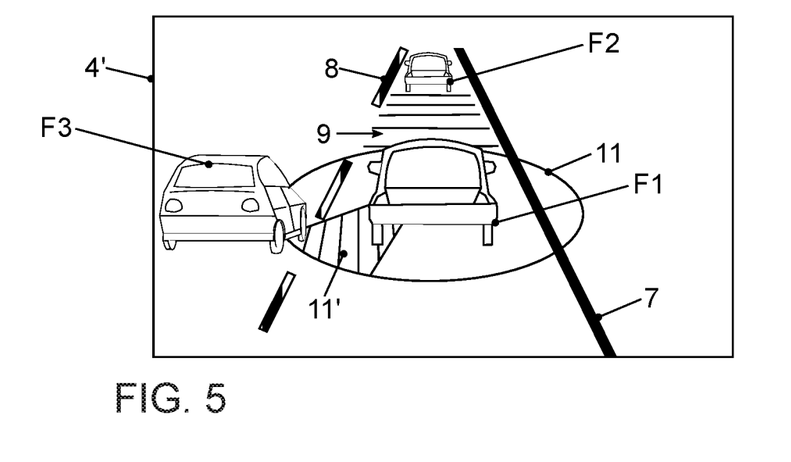
FIG. 5 shows a third display which can be generated by the disclosed method.

If it is sensed in operation at S7 that the overtaking prohibition has been lifted but the speed limit still applies, the speed of the transportation vehicle traveling ahead is firstly determined. If for an overtaking maneuver the speed of 80 km/h has to be exceeded, the display in FIG. 5 is maintained in such a way that the graphic roadway marking 8 is displayed in a continuous state. In this case the overtaking maneuver also cannot be carried out. If the speed of 80 km/h must not be exceeded, the display in FIG. 3 is restored. In this case, the overtaking maneuver can be carried out.

Furthermore, an overtaking maneuver can be categorized as not being able to be carried out if it is sensed that cutting in again to the original lane is not possible. This is the case, for example, if an oncoming road user is sensed which reaches the position of the transportation vehicle 1 on the oncoming lane before the transportation vehicle 1 can cut in again. Furthermore, it can be sensed that an interrupted roadway marking changes into a continuous roadway marking before the overtaking maneuver can be concluded.

With reference to FIG. 5, a further display which can be generated on the display area 4' is explained.

The starting situation here is that the transportation vehicle 1 is driving on a freeway which has three lanes in each direction of travel. In this context, the transportation vehicle 1 is located on the right-hand lane of the freeway. The display shown in FIG. 3 is displayed again. As a result of the fact that the roadway marking 7 is displayed as a continuous roadway marking, it is displayed to the driver that a lane change to the right is not possible. Only the hard shoulder onto which it is possible to change only if it has been explicitly released for driving is located there. In the present exemplary embodiment, the hard shoulder is not released for driving.

In operation at S4 of the method, instead of the road signs a transportation vehicle which is approaching from the rear is sensed. In this case, this transportation vehicle is sensed on the middle lane of the freeway, that is to say on the lane to the left of the transportation vehicle 1. Starting from a certain distance from the transportation vehicle 1 a safe lane change is no longer possible for the transportation vehicle 1. The autonomously driving transportation vehicle 1 would in this case not carry out a lane change in the case of an active driving maneuver function.

To display this to the driver, in operation at S5 of the method the roadway marking 8 is displayed highlighted in comparison with the display mode of the roadway marking 8 from FIG. 3. The color of the graphic roadway marking 8 is changed. If this was displayed, for example, in white in a first display mode which relates to a driving maneuver which can be carried out, in a second display mode which relates to a driving maneuver which cannot be carried out it is displayed in orange. As a result, the roadway marking 8 is given a warning character which displays to the driver that the driving maneuver cannot be carried out. However, the roadway marking 8 continues to be displayed in an interrupted state. This is intended to display to the driver that there is no general prohibition on a lane change but rather that the lane change would not be carried out owing to a temporary risk.

To inform the driver in a more detailed state as to why a lane change is not possible, a graphic object F3 is also generated for the transportation vehicle which is approaching from the left at the rear. In addition, a graphic object 11 is generated which displays a position marking for the approaching transportation vehicle. The graphic object 11 is configured as a closed ellipsoidal curve which is positioned around the ego transportation vehicle F1. In this context, a part 11' of the ellipsoidal curve 11 is displayed in the highlighted state at the position of the graphic object F3. The part 11' is here a segment of the ellipsoidal curve 11.

The graphic object 11 can additionally already be displayed on the display in FIG. 3. If no transportation vehicle approaching from the rear is sensed, the segment 11' of the ellipsoidal curve 11 is not displayed in the highlighted state.

The displays described above also display here whether a lane change or overtaking maneuver can be carried out if the driving maneuver function has not been activated. This means that it is already displayed in advance of activation of function whether a driving maneuver which is assigned to the driving maneuver function can be carried out at all. As long as the driving maneuver cannot be carried out, the driver must also not activate the driving maneuver function. This additionally brings about a higher acceptance level of automatically operating driving functions in a transportation vehicle which is driving at least partially autonomously.

Figure 6:
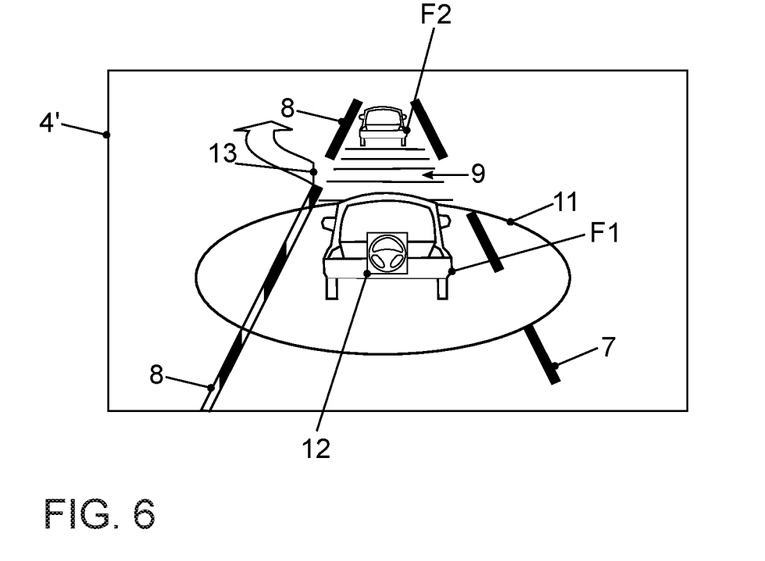
FIG. 6 shows a further display which can be generated by the disclosed method.

With reference to FIGS. 2 and 6, a second exemplary embodiment of continuation of the disclosed method according to operation at S5 and a display generated by this continuation are explained.

The starting situation here is again that the transportation vehicle 1 is driving on a three-lane freeway. In this context, the transportation vehicle 1 is moving on the middle lane of the three lanes. The lane which is to the left of the transportation vehicle 1 is here a freeway feed lane which is separated from the middle lane by a real, continuous roadway marking given the instantaneous position of the transportation vehicle 1.

It is sensed in operation at S4 that the roadway marking which lies to the left of the transportation vehicle 1 is continuous. A lane change at the instantaneous position of the transportation vehicle 1 to the left is therefore not possible. In contrast, a lane change to the right is possible given the instantaneous position of the transportation vehicle 1.

Therefore, in operation at S5, an interrupted roadway marking 7 is generated to the right of the ego transportation vehicle 4, and a continuous roadway marking 8 is generated to the left of the ego transportation vehicle 4.

The driver presses the flashing indicator light lever 14 down again. A signal is generated which displays that the driving maneuver function has been activated. This signal is sensed in operation at S6. The driving maneuver function is activated. In addition, a setpoint direction in which the driving maneuver is to be executed is determined from the signal. As a result of the pressing of the flashing indicator light lever 14 downward, it is determined that the driving maneuver is to be carried out to the left.

Firstly, in operation at S7 a graphic object 12, by which it is displayed that the driving maneuver function has been activated, is generated on the display area 4'. The graphic object 12 displays here a graphic representation of a steering wheel. The graphic object 12 displays to the driver that the activation of the driving maneuver function has been sensed by the transportation vehicle 1. The driver can then be assured that the desired driving maneuver will be carried out as soon as possible.

In operation at S8 the position which is closest to the transportation vehicle 1 and at which the requested lane change is possible is determined. It is sensed, for example, that the real continuous roadway marking changes in 200 m into an interrupted real roadway marking. The lane change can therefore be carried out in 200 m. Furthermore, in operation at S8 a trajectory is predicted for the lane change, which the transportation vehicle 1 will probably follow to execute the lane change.

In operation at S9, a graphic object 13, such as an arrow, is generated on the display area 4'. The position of the graphic object 13 is positioned here relative to the ego transportation vehicle F1 on the display area 4' in such a way that the position at which the overtaking maneuver will start is displayed to the driver. The starting position of the lane change is displayed here by the start of the arrow 13. The further profile of the arrow 13 displays the predicted trajectory. In addition, the graphic object 13 is generated on the left-hand side of the ego transportation vehicle F1, since it has been determined that the lane change will occur to the left.

Furthermore, the graphic object 8 is generated in such a way that starting from the position at which the lane change can be carried out again it changes, like the real roadway marking, into a graphic roadway marking 8 which is displayed in an interrupted state.

If the ego transportation vehicle F1 has reached the position at which the start of the arrow 13 is displayed, in operation at S10 the left-hand flashing indicator lights 16.1 and 16.2 are firstly activated so that a flashing indicator light signal to the left is generated. As a result, it is displayed to other road users that the transportation vehicle is now carrying out a lane change to the left. Furthermore, in operation at S10 the lane change is actually carried out.

operation at S10 is followed again by operation at S4 of the method in which the data on the surroundings are collected.

Furthermore, all the explained displays can be combined with one another or can change into one another. This means that the display of the graphic object 11 can be displayed at any of the explained displays. The position of a sensed road user who is approaching from the rear can be displayed at any time by a segment of the ellipsoidal curve 11 which is displayed in a highlighted state. The ellipsoidal curve 11 can be displayed in any of the explained displays around the ego transportation vehicle F1.

Furthermore, when it is sensed that the driving maneuver can be carried out and, for example, the display from FIG. 3 is generated on the display area 4', the driver can actuate the flashing indicator light lever so that the driving maneuver function is activated. The driving maneuver is then carried out immediately.

The dividing line 15 in FIG. 2 also displays that the method operations at 51 to S5 can be carried out alone. This displays that activation of the driving maneuver function is not necessary to generate the displays in FIGS. 3 to 5.

LIST OF REFERENCE SYMBOLS

1 Transportation vehicle
2.1, 2.2 Sensing unit; camera
3 Determining unit
4 Display unit
4' Display area
5 Control device
6 Device
7-13 Graphic object
14 Actuation element; flashing indicator light lever
15 Dividing line
16 Flashing indicator light device
16.1, 16.2 Flashing indicator light
F1 Graphic object; ego transportation vehicle
F2, F3 Graphic object; representations of other road users
S1-S9 Method operations

The invention claimed is:

1. A method for displaying the feasibility of a driving maneuver which is carried out at least partially automatically in a transportation vehicle, the method comprising:
    collecting data on the surroundings of the transportation vehicle;
    determining from the data on the surroundings whether the driving maneuver is able to be carried out at the current position of the transportation vehicle;
    generating a first graphic object which signals whether the driving maneuver is able to be carried out; and
    displaying the first graphic object on a display area, wherein the first graphic object is displayed in a first display mode in response to a determination that the driving maneuver is able to be carried out, and is altered and displayed in a second display mode in a same location in the display in response to a determination that the driving maneuver previously determined to be able to be carried out instantaneously cannot be carried out, wherein in the second display mode the first graphic object differs from a real roadway marking at a position where the driving maneuver instantaneously cannot be carried out, wherein the first graphic object comprises a graphic roadway marking, wherein the graphic roadway marking is displayed as an interrupted roadway marking in the first display mode, and is displayed as a continuous roadway marking in the second display mode, and
    generating a second graphic object which represents the transportation vehicle and displaying the second graphic object on the display area, wherein a fifth graphic object is generated around the second graphic object which represents the transportation vehicle, and wherein the position of another road user is displayed relative to the transportation vehicle by a change in a portion of the fifth graphic object in response to another road user being sensed.

2. The method of claim 1, wherein the driving maneuver is a lane change or an overtaking maneuver.

3. The method of claim 1, further comprising:
    determining the feasibility of the driving maneuver in a direction proceeding from the transportation vehicle; and
    displaying the first graphic object on the side of the second graphic object lying in the determined direction.

4. The method of claim 1, further comprising:
    assigning the driving maneuver to a driving maneuver function;
    sensing an activation signal of the driving maneuver function;
    generating a third graphic object which displays that the driving maneuver function is active; and
    automatically performing the driving maneuver in response to determination that the driving maneuver is able to be carried out.

5. The method of claim 4, wherein the signal is triggered in response to actuation of an actuation element being sensed.

6. The method of claim 4, wherein
    a setpoint direction in which the driving maneuver is performed is determined from the signal, and
    a light signal with a flashing indicator light device of the transportation vehicle is not generated on the side of the transportation vehicle lying in the determined setpoint direction until the start of the automatic driving maneuver.

7. The method of claim 4, wherein
    in response to the driving maneuver not being able to be performed at the current position, a position at which the driving maneuver is able to be performed is determined, and
    a fourth graphic object is generated on the display area which displays the position at which the driving maneuver is expected to be able to be performed.

8. The method of claim 7, wherein the fourth graphic object is displayed on the side of the second graphic object lying in the determined setpoint direction.

9. The method of claim 1, wherein a trajectory is predicted for the driving maneuver, and the profile of the predicted trajectory is displayed on the display area.

10. The method of claim 1, wherein the fifth graphic object is embodied as a closed curve, wherein the position of the sensed road user is displayed by highlighted representation of a part of the closed curve at which the road user is located.

11. A device for displaying the feasibility of a driving maneuver which is performed at least partially automatically in a transportation vehicle, the device comprising:
    a sensing unit for collecting data on the surroundings of the transportation vehicle;
    a determining unit which determines, based on data from the surroundings, whether the driving maneuver is able to be performed at the current position of the transportation vehicle;
    a control device; and
    a display unit which is actuated by the control device so that a first graphic object which signals whether the driving maneuver is able to be performed is displayed on a display area of the display unit,
    wherein the first graphic object is displayed in a first display mode in response to a determination that the driving maneuver is able to be carried out, and is altered and displayed in a second display mode in a same location in the display in response to a determination that the driving maneuver previously determined to be able to be carried out instantaneously cannot be carried out,
wherein in the second display mode the first graphic object differs from a real roadway marking at a position where the driving maneuver instantaneously cannot be carried out, wherein the first graphic object comprises a graphic roadway marking, wherein the graphic roadway marking is displayed as an interrupted roadway marking in the first display mode, and is displayed as a continuous roadway marking in the second display mode,
wherein a second graphic object which represents the transportation vehicle is generated and displayed on the display area,
wherein a fifth graphic object is generated around the second graphic object, which represents the transportation vehicle, and
wherein the position of the other road user is displayed relative to the transportation vehicle by a change in a portion of the fifth graphic object in response to another road user being sensed.

12. A transportation vehicle comprising the device of claim 11.

13. The device of claim 11, wherein the driving maneuver is a lane change or an overtaking maneuver.

14. The device of claim 11, wherein the first graphic object comprises a graphic roadway marking, wherein the graphic roadway marking is displayed as an interrupted roadway marking in the first display mode, and is displayed as a continuous roadway marking in the second display mode.

15. The device of claim 11, the feasibility of the driving maneuver in a direction proceeding from the transportation vehicle is determined, and the first graphic object is displayed on the side of the second graphic object lying in the determined direction.

16. The device of claim 11, wherein the driving maneuver is assigned to a driving maneuver function, a driving maneuver function activation signal is sensed, a third graphic object which displays that an indication that the driving maneuver function is active is generated, and the driving maneuver is performed automatically in response to determination that the driving maneuver is able to be carried out.

* * * * *